United States Patent [19]

Peters et al.

[11] Patent Number: 5,015,726

[45] Date of Patent: May 14, 1991

[54] POLYAMIDE FROM TOLUENEDIAMINE

[75] Inventors: Edward N. Peters, Lenox, Mass; Geoffrey H. Riding, Castleton, N.Y.; G. F. Willard, Dalton, Mass.

[73] Assignee: General Electric Company, Pittsfield, Mass.

[21] Appl. No.: 529,678

[22] Filed: May 25, 1990

Related U.S. Application Data

[63] Continuation of Ser. No. 301,194, Jan. 24, 1989, abandoned.

[51] Int. Cl.$^5$ .............................................. C08G 69/32
[52] U.S. Cl. .................................. 528/349; 428/474.4; 524/606; 524/607; 528/338; 528/339; 528/340; 528/347
[58] Field of Search ............... 528/349, 347, 338, 339, 528/340; 524/606, 607

[56] References Cited

U.S. PATENT DOCUMENTS

| | | | |
|---|---|---|---|
| 4,418,181 | 11/1983 | Monacelli | 525/426 |
| 4,501,879 | 2/1985 | Barbee et al. | 528/288 |
| 4,539,393 | 9/1985 | Tamura et al. | 528/348 |
| 4,567,249 | 1/1986 | Fox et al. | 528/347 |
| 4,721,772 | 1/1988 | Ueno et al. | 528/336 |
| 4,864,009 | 9/1989 | Finke et al. | 528/172 |
| 4,885,356 | 12/1989 | Milligan et al. | 528/340 |

FOREIGN PATENT DOCUMENTS

| | | |
|---|---|---|
| 0259676 | 3/1988 | European Pat. Off. |
| 0348825 | 1/1990 | European Pat. Off. |
| 49-013516 | 4/1974 | Japan |
| 48091197 | 9/1979 | Japan |
| 49097096 | 10/1981 | Japan |

OTHER PUBLICATIONS

L. H. Gan, P. Blais, D. J. Carlsson, T. Suprunchuk and D. M. Wiles, Journal of Applied Polymer Science, 19; 69 (1975).

*Primary Examiner*—Harold D. Anderson
*Attorney, Agent, or Firm*—Spencer D. Conard; William F. Mufatti

[57] ABSTRACT

An amorphous polyamide having a high heat distortion temperature is produced by reacting toluenediamine with isophthalic acid, and optionally terephthalic acid, in the presence of either an aliphatic diacid, an aliphatic diamine or a mixture thereof. The polyamide provides the combined properties of a high heat distortion temperature, low shrinkage upon cooling, high levels of chemical resistance, is processable at temperatures below its degradation temperature, and has a high flexural modulus. With these combined properties the polyamide is particularly suitable for fiber reinforced automotive applications requiring exposure to excessive heat in conventional automotive paint bake ovens.

18 Claims, No Drawings

POLYAMIDE FROM TOLUENEDIAMINE

This is a continuation of application Ser. No. 07/301,194 filed Jan. 24, 1989, now abandoned.

BACKGROUND OF THE INVENTION

1. Field of the Invention

This invention relates to a polyamide derived from toluenediamine and, more particularly, relates to a polyamide derived from toluenediamine and isophthalic acid, and optionally terephthalic acid, aliphatic diamine or a mixture thereof.

2. Description of Related Art

Plastics have been finding increased utility as replacements for metal in the manufacture of automobile body parts. Specifically, plastics have been incorporated in the production of vertical body panels and fenders. These plastics, however, have generally lacked the combined physical properties necessary to produce a horizontal body panels paintable in conventional, high temperature, automotive paint bake ovens without substantial hand finishing steps. Problems arising in using these plastics as automotive reinforced horizontal body panels include the fact that either (a) the processing of these plastics is difficult because their melt viscosities are too high at processing temperatures below where substantial polymeric degradation occurs, (b) the polymers exhibit excessive shrinkage around reinforcing fibers upon cooling of the panel thereby causing a rough surface, (c) condensation reactions occur within the plastic upon exposure to heat during painting resulting in bubbling of the paint and distortion of the painted surface, or (d) the panels made from the plastic experience shape distortion at paint bake oven temperatures. Plastics for the production of horizontal automotive body panels should have the combined properties of (a) a high heat of distortion so that the shape of fiber reinforced parts made therefrom will not become distorted at the high temperatures encountered during painting, (b) a melt viscosity low enough at standard processing temperatures to permit processing thereof without substantial polymeric degradation, (c) an amorphous nature so that the plastic experiences minimum shrinkage around reinforcing fibers during cooling following painting thereof in a conventional, high temperature, automotive paint bake oven, (d) high resistance to standard automotive fluids, (e) low flammability, and (f) high flexural strength.

Thus, one object of the present invention is to provide a thermoplastic which is amorphous, has a high heat of distortion temperature, exhibits good chemical resistance, has a melt viscosity which is low enough at processing temperatures to permit processing without substantial polymeric degradation, has low flammability, and exhibits high strength.

SUMMARY OF THE INVENTION

This invention provides an amorphous polyamide which has a high heat of distortion temperature, exhibits good chemical resistance, is processable at temperatures sufficiently low to prevent substantial polymeric degradation, has low flammability and exhibits high flexural strength. The polyamide of the present invention is derived from toluenediamine and isophthalic acid, and optionally terephthalic acid, in the presence of either an aliphatic diamine, an aliphatic diacid or a mixture thereof. The polyamide of the present invention is particularly useful in the production of glass fiber reinforced horizontal automotive body panels which must undergo painting at high temperatures in conventional paint bake ovens.

DETAILED DESCRIPTION OF THE INVENTION

This invention relates to polyamides derived from toluenediamine and fiber reinforced articles made therefrom. The polyamide of the present invention is produced by reacting toluenediamine with isophthalic acid, and optionally terephthalic acid, in the presence of either an aliphatic diacid, an aliphatic diamine or a mixture thereof.

The polyamide is obtained from a reaction mixture of a diamine and a dicarboxylic acid or reactive derivative thereof. The diamine is present at a level of from 48 to 52 mole percent based on the total moles of diamine and dicarboxylic acid employed, more preferably present at a level of about 50 mole percent thereof. The dicarboxylic acid or reactive derivative thereof is present at a level of from 48 to 52 mole percent based on the total moles of diamine and dicarboxylic acid employed and more preferably present at a level of about 50 mole percent thereof. Preferably the diamine comprises a toluenediamine present at a level of 10 to 50 mole percent based on the total moles of diamine and dicarboxylic acid and more preferably present at a level of from 20 to 40 mole percent thereof, and most preferably present at a level of 35 mole percent thereof; and preferably the diamine further comprises an aliphatic diamine present at a level of from 0 to 40 mole percent based on the total moles of diamine and dicarboxylic acid, more preferably present at a level of from 10 to 30 mole percent thereof, and most preferably at a level of 15 mole percent thereof. The dicarboxylic acid comprises isophthalic acid, and optionally terephthalic acid, and further optionally an aliphatic dicarboxylic acid. The isophthalic acid preferably is present at a level of from 5 mole percent to 50 mole percent based on the total moles of diamine and dicarboxylic acid, more preferably the isophthalic acid is present at a level of 25 to 45 mole percent thereof and most preferably is present at a level of 37.5 mole percent thereof; the isophthalic acid being present at a level of at least 5 mole percent based on the total moles of diamine and dicarboxylic acid in order to insure that the polyamide is an amorphous polyamide; preferably the terephthalic acid is present at a level of 0 to 27.5 mole percent based on the total moles of diamine and dicarboxylic acid, more preferably is present at a level of 5 to 20 mole percent thereof and most preferably is present at a level of 12.5 mole percent thereof; and preferably the aliphatic dicarboxylic acid is present at a level of from 0 to 45 percent by weight based on the total moles of diamine and dicarboxylic acid more preferably from 0 to 20 mole percent thereof and most preferably 0 mole percent thereof. The combined total moles of aliphatic diamine and aliphatic dicarboxylic acid should be present at a level of from 5 to 45 mole percent based on the total moles of diamine and dicarboxylic acid, more preferably 10 to 35 mole percent thereof and most preferably 15 mole percent thereof. The combined total moles of aliphatic diamine and aliphatic dicarboxylic acid must be at a level of at least 5 mole percent based on the total moles of diamine and dicarboxylic acid in order to produce a toluenediamine based polyamide which has a melt viscosity low enough at temperatures below its degradation temperature to permit melt processing of the polyamide. The term dicarboxylic acid is meant to include reactive derivatives thereof such as diaryl esters thereof and acid halides thereof. The decision of whether to employ a dicarboxylic acid or a diaryl ester thereof will depend on the process to be employed.

The toluenediamine may be any of the toluenediamine isomers or mixtures thereof. Preferably the toluenediamine is a mixture of toluenediamine isomers and comprises from 10 to 30 mole percent of 2,6 toluenediamine based on the total moles of toluenediamine and more preferably about 20 mole percent thereof, and preferably the toluenediamine further comprises from 70 to 90 mole percent 2,4 toluenediamine and more preferably about 80 mole percent thereof. 2,6 toluenediamine may be represented by the formula:

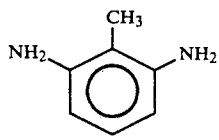
(I)

and 2,4 toluenediamine may be represented by the formula:

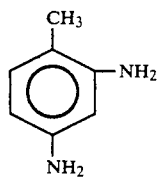
(II)

The aliphatic diamines may be straight or branched aliphatic diamines and have from 2 to 12 carbon atoms, more preferably have 4 to 8 carbon atoms and most preferably have 6 carbon atoms. The most preferred aliphatic diamine is hexamethylenediamine, which may be represented by the formula:

$$H_2N-(CH_2)_6-NH_2 \quad (III)$$

Other suitable aliphatic diamines include methylpentadiamine, which may be represented by the formula:

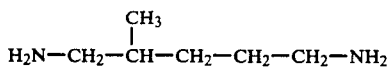
(IV)

The isophthalic acid is meant to include reactive derivatives thereof. Isophthalic acid may be represented by the formula:

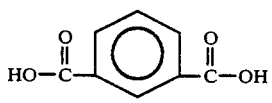
(V)

Reactive derivatives isophthalic acid include esters such as diphenylisophthalate which may be represented by the formula:

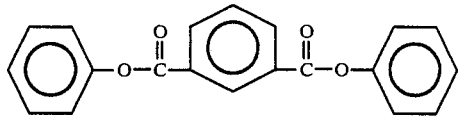
(VI)

Other reactive derivatives include the isophthaloyl halides such as isophthaloyl chloride.

The terephthalic acid is meant to include reactive derivatives thereof. Terephthalic acid may be represented by the formula:

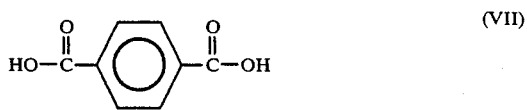
(VII)

Reactive derivatives of terephthalic acid include esters such as diphenylterephthalate which may be represented by the formula:

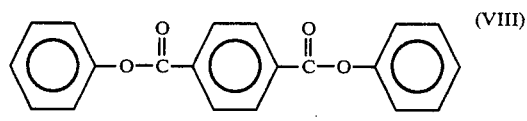
(VIII)

Other reactive derivatives include the terephthaloyl halides such as terephthaloyl chloride.

Aliphatic dicarboxylic acid is meant to include reactive derivatives such as esters thereof. The aliphatic dicarboxylic acids may be represented by the general formula:

(IX)

wherein $R^1$ is a direct bond or a divalent straight or branched aliphatic radical containing from 1 to 12 carbon atoms, preferably 1 to 6 carbon atoms and most preferably 4 carbon atoms. Thus the aliphatic dicarboxylic acid preferably contains from 2 to 14 carbon atoms, more preferably contains from 3 to 8 and most preferably 6. The preferred aliphatic dicarboxylic acid is adipic acid which may be represented by the formula:

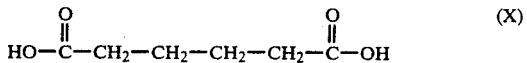
(X)

The polyamide of the present invention comprises the reaction product of the diamine and the dicarboxylic acid and may be characterized as having units selected from the group consisting of:

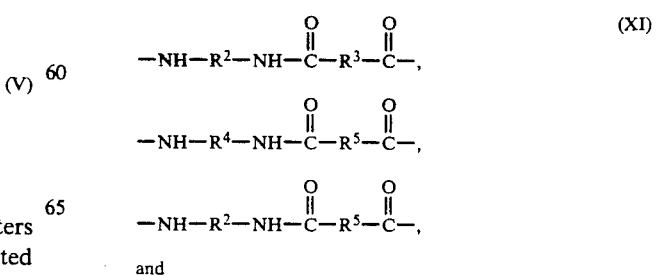

and

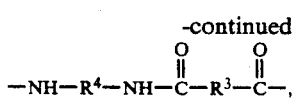

wherein $R^2$ is independently selected from the group consisting of:

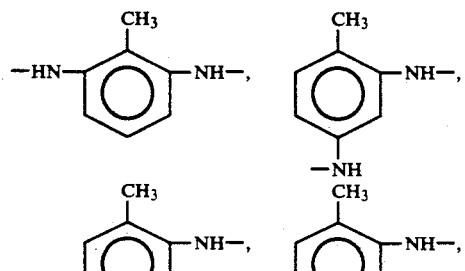

(XII)

and

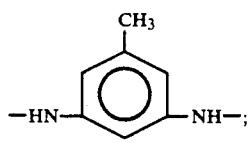

wherein $R^3$ is independently selected from the group consisting of direct bond and straight and branched aliphatic divalent radicals having from 1 to 12 carbon atoms therein, more preferably 1 to 6 carbon atoms, therein, and most preferably 4 carbon atoms therein, wherein $R^4$ is independently selected from the group consisting of straight and branched aliphatic divalent radicals having from 2 to 12 carbon atoms therein, more preferably from 4 to 8 carbon atoms therein and most preferably 6 carbon atoms therein, and wherein $R^5$ is independently selected from the group consisting of:

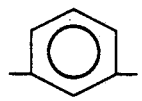
(XIII)

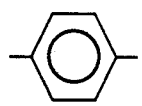
(XIV)

wherein the ratio of moles of:

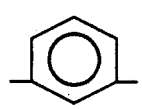
(XV)

to moles of:

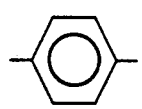
(XVI)

in the total moles of $R^5$ is between 5:27.5 and 50:0, more preferably is between 25:20 and 45:5 and most preferably at a ratio of about 75:25.

Preferably $R^2$ is present in the polyamide at a level of from 10 to 50 mole percent based on the total moles of $R^2$, $R^3$, $R^4$ and $R^5$ in the polyamide, more preferably at a level of 20 to 40 mole percent thereof, and most preferably at a level of 35 mole percent thereof; preferably $R^3$ is present in the polyamide at a level of from 0 to 45 mole percent based on the total moles of $R^2$, $R^3$, $R^4$ and $R^5$ in the polyamide, more preferably at a level of 0 to 20 mole percent thereof, and most preferably at a level of 0 mole percent thereof; preferably $R^4$ is present in the polyamide at a level of from 0 to 40 mole percent based on the total moles of $R^2$, $R^3$, $R^4$ and $R^5$ in the polyamide, more preferably at a level of 10 to 30 mole percent thereof, and most preferably at a level of 15 mole percent thereof; and preferably $R^5$ is present in the polyamide at a level of from 5 to 50 mole percent based on the total moles of $R^2$, $R^3$, $R^4$ and $R^5$ in the polyamide, more preferably at a level of 30 to 50 mole percent thereof, and most preferably at a level of 50 mole percent thereof. The combined total moles of $R^3$ and $R^4$ is present at a level of at least 5 mole percent based on the total moles of $R^2$, $R^3$, $R^4$ and $R^5$ in the polyamide. The combined total moles of $R^3$ and $R^4$ should be present at a level of from 5 to 4.5 mole percent based on the total moles of $R^2$, $R^3$, $R^4$ and $R^5$, preferably present at a level of from 5 to 45 mole percent thereof, more preferably at a level of from 10 to 35 mole percent thereof and most preferably at a level of 15 mole percent thereof. The polyamide is amorphous, that is, it has no detectable melting point.

The polyamides may be prepared by either a salt process or by acid-ester interchange in a melt process. The melt process involves reacting the diamine with a diaryl ester derivative of the carboxylic acid. When an aliphatic diamine is employed, the reaction preferably involves a first step wherein the toluenediamine is pre-reacted with diphenylisophthalate or mixture of diphenylisophthalate and diphenylterephthalate so that the toluenediamine is endcapped with the diarylester and involves a second step wherein the aliphatic diamine is reacted with the endcapped toluenediamine and any unreacted diarylester to produce the polyamide. This two-step process makes it possible to produce a polyamide from the slow reacting toluenediamine and the highly reactive aliphatic diamines. Using a one-step process results in the toluenediamine not reacting sufficiently to yield the desired polyamide at a sufficiently high molecular weight. The two-step reaction allows the entire reaction to proceed quickly producing a polyamide having sufficiently high molecular weight. The two-step reaction may be employed in either the melt process or the salt process.

The two-step melt process involves a first step of charging the toluenediamine and the diarylesters of the dicarboxylic acids into a reaction vessel and heating the reactants to a temperature selected from between 135° C. to 360° C. to melt the reactants. The reaction may be conducted at reduced pressures to remove by products such as phenol. Upon completion of the reaction of the first step, the aliphatic diamine may then be charged to the reaction vessel to complete the reaction and form the polyamide. The temperature of the reaction vessel should be maintained at from between 135° C. to 360° C. during the second step to encourage completion of the reaction. The phenolic byproducts may be removed either during the reaction process or following completion of the reaction.

The polyamides of the present invention find particular utility in glass fiber reinforced body panels for automotive application requiring painting in conventional high temperature automotive paint bake ovens. These polyamides may be used in the production of compression molded glass fiber reinforced shaped panels. In addition to glass fibers, suitable fibers for various uses also include carbon fibers, aramid fibers and metal fibers. The polyamide is (a) amorphous resulting in minimum shrinkage of the polyamide around the fiber following cooling of the panel, (b) has a high heat distortion temperature which minimizes shape distortion during exposure to the high temperatures encountered in conventional automotive paint bake ovens, (c) has high flexural strength which is needed in automotive body panels, (d) has good chemical resistance to automotive fluids, and (e) has melt viscosities sufficiently low at temperatures below decomposition temperatures to permit processing thereof. Suitable fiber reinforced panels may be provided by laminating layers of the polyamide to long glass fiber mats such that the laminate has alternating layers of polyamide and long glass fiber mat with the laminate having outer layers of polyamide. The polyamide layers may also be fiber reinforced but the outer layers are preferably substantially fiber free. Suitable equipment and processes for producing a high strength fiber glass reinforced thermoplastic sheet from the polyamide of the present invention is set forth in Picone, U.S. Pat. No. 4,277,531 which is incorporated herein by reference.

It is contemplated that the polyamide of the present invention may be fiber reinforced and may also contain fillers such as powders of silica, talc and mica as well as other conventional fillers. Fiber reinforced articles may be produced by the process set forth in Gatward, et. al., U.S. Pat. No. 3,716,449 which is incorporated herein by reference.

The preferred fiber reinforced article is obtained by compressing and heating a multilayered structure comprising first and second outer polyamide layers, first and second glass mats between said first and second outer polyamide layers, and a melted polyamide layer between said first and second glass mats.

The fiber reinforced polyamide compositions and articles preferably comprise from 5 to 50 percent by weight glass and from 95 to 50 percent by weight polyamide.

It is also contemplated that the polyamide may be blended with other thermoplastics such as polycarbonates, polyesters, polyolefins, polyphenylene ether, and other polyamides.

The polyamide is also expected to find utility as a gas barrier layer for food containers that need shape retention at high temperatures.

EXAMPLES

The following examples are presented by way of illustration and are not meant to limit the scope of the invention.

The polymers set forth in the examples were obtained by adding the diaryl ester (ester of the dicarboxylic acid) to the toluene diamine and a phenyl benzoate chain stopper (1.25 mole %), heating the mixture to 220° C. for one hour and then at 280° C. for two hours, cooling the material to 150° C., then adding the remaining amines and heating the mixture to 190° C. for 1.5 hours and removing the phenol byproduct and building the polymer. The diamines are listed as mole percent based on the total moles of diamine. The diaryl esters are listed as mole percent based on the total moles of diaryl ester.

TABLE 1

| Example | DIAMINE TDA[a] | HMDA[b] | DIARYL ESTER DPI[c] | IV[d] | Tg(°C.) |
| --- | --- | --- | --- | --- | --- |
| 1. | 20 | 80 | 100 | 0.66 | 143 |
| 2. | 25 | 75 | 100 | 0.77 | 151 |
| 3. | 30 | 70 | 100 | 0.97 | 162 |
| 4. | 40 | 60 | 100 | 0.97 | 176 |
| 5. | 50 | 50 | 100 | 0.85 | 191 |

[a]TDA = a mixture comprising about 80 mole % 2,4 toluenediamine and about 20 mole % 2,6 toluenediamine. The total TDA is listed as mole percent of total diamine reacted.
[b]HMDA = Hexamethylenediamine and is listed as mole percent of total diamine reacted.
[c]DPI = Diphenylisophthalate and is listed as mole percent of total diarylester reacted.
[d]IV = intrinsic viscosity of the polyamide obtained and is measured in deciliters/gram at 30° C. in a 40:60 tetrachloroethane:phenol mixture.

TABLE 2

| Example | DIAMINE TDA[a] | HMDA[b] | DIARYL ESTER DPI[c] | DPT[e] | IV[d] | Tg(°C.) |
| --- | --- | --- | --- | --- | --- | --- |
| 6. | 50 | 50 | 70 | 30 | 0.82 | 191 |
| 7. | 60 | 40 | 75 | 25 | 1.05 | 210 |

[e]DPT = Diphenylterephthalate and is listed as mole percent of total diaryl ester reacted.

TABLE 3

| Example | DIAMINE TDA[a] | DMP[f] | DIARYL ESTER DPI[c] | DPT[e] | IV[d] | Tg(°C.) |
| --- | --- | --- | --- | --- | --- | --- |
| 8. | 45 | 55 | 70 | 30 | 0.87 | 194 |
| 9. | 25 | 75 | 70 | 30 | 0.93 | 168 |

[f]DMP = Diamino-2-methylpentane (2-methylpentylenediamine) and is listed as mole percent of total diamine reacted.

TABLE 4

| Example | DIAMINE TDA[a] | DIARYL ESTER DPI[c] | DPA[g] | IV[d] | Tg(°C.) |
| --- | --- | --- | --- | --- | --- |
| 10. | 100 | 60 | 40 | 0.53 | 214 |
| 11. | 100 | 40 | 60 | 0.66 | 189 |
| 12. | 100 | 20 | 80 | 0.61 | 171 |

[g]DPA = Diphenyladipate and is listed as mole percent of total diaryl ester reacted.

TABLE 5

| Example | DIAMINE TDA[a] | EDA[h] | HMDA[b] | DIARYL ESTER DPI[c] | DPA[g] | IV[d] | Tg(°C.) | AN[i] |
| --- | --- | --- | --- | --- | --- | --- | --- | --- |
| 13. | 0 | 70 | 30 | 100 | 0 | 0.33 | 158 | 195 |
| 14. | 0 | 60 | 40 | 100 | 0 | 0.32 | 155 | 272 |
| 15. | 10 | 52.5 | 37.5 | 100 | 0 | 0.35 | 158 | 167 |
| 16. | 10 | 40 | 50 | 100 | 0 | 0.44 | 165 | 230 |
| 17. | 20 | 35 | 45 | 100 | 0 | 0.36 | 168 | 214 |
| 18. | 20 | 20 | 60 | 100 | 0 | 0.48 | 159 | 144 |
| 19. | 30 | 17.5 | 52.5 | 100 | 0 | 0.58 | 173 | 125 |

TABLE 5-continued

| Example | DIAMINE TDA(a) | EDA(h) | HMDA(b) | DIARYL ESTER DPI(c) | DPA(g) | IV(d) | Tg(°C.) | AN(i) |
|---|---|---|---|---|---|---|---|---|
| 20. | 30 | 0 | 70 | 100 | 0 | 0.95 | 162 | 144 |
| 21. | 40 | 0 | 60 | 100 | 0 | 0.97 | 176 | 111 |
| 22. | 50 | 0 | 50 | 70 | 30 | 0.82 | 194 | 75 |

(h)EDA = ethylene diamine and is listed as mole percent of total diamine
(i)AN = amine number of resultant polymer and is in meq/kg.

TABLE 6

| Example | DIAMINE TDA(a) | EDA(h) | MPDA(j) | DIARYL ESTER DPI(c) | DPT(e) | IV(d) | Tg(°C.) | AN(i) |
|---|---|---|---|---|---|---|---|---|
| 23. | 45 | 0 | 55 | 70 | 30 | 0.62 | 189 | 48 |

(j)MPDA = 2-methylpentylenediamine and is listed as mole percent of total diamine.

TABLE 7

| Example | Type | IV(d)(dl/g) | Tg(°C.) | MI(k)(g/10 min) |
|---|---|---|---|---|
| 24. | 70/30/75/25 TDA/HMDA/DPI/DPT | 0.68 | 211 | .19 |
| 25. | 70/30/75/25 2,4-TDA(l)/HMDA/DPI/DPT | 0.24 / 0.26 | 184 / 186 | 19.4 |
| 26. | 50/50/75/25 TDA/PIP(m)/DPI/DPT | 0.36 | 198 | 1.35 |
| 27. | 45/55/100 TDA/MPDA/IA(n) | 0.87 | 194 | — |
| 28. | 70/30/75/25 TDA/MPDA/DPI/DPT | 0.38 | 206 | 1.95 |
| 29. | 50/50/50/50 TDA/MPDA/DPI/DPA(o) | 0.74 | 141 | 41.9 |
| 30. | 50/25/25/100 TDA/HMDA/MXDA(p)/DPI | 0.73 | 200 | — |
| 31. | 100/60/40 TDA/DPI/DPA | 0.15 | 159 | 142 |
| 32. | 100/40/60 TDA/DPI/DPA | 0.43 | 201 | |
| 33. | 100/60/40 TDA/DPI/DPA* | 0.32 | 197 | |
| 34. | 100/60/40 TDA/IA(q)/AA(r)* | 0.07 | decomposed | |
| 35. | 90/10/75/25 TDA/HMDA/DPI/DPT | 0.15 | 173 | 317 |
| 36. | 100/60/40 TDA/IA/Glutaric* | 0.18 | 207 | 16.3 |
| 37. | 70/30/75/25 TDA/HMDA/DPI/DPA | 0.77 | 185 | 1.54 |
| 38. | 50/50/50/50 TDA/MPD/DPI/DPA | 0.14 | 134 | 26.6 |

(k)MI = melt index in g/10 min as determined at 315° C. and 1200 gram load. It is important to have a high melt flow for polyamide/glass mat laminates so that the polyamide will flow into the mat upon compression and heating thereof.
(l)2,4 TDA = substantially pure 2,4 toluene diamine.
(m)PIP = piperazine and is listed as mole percent based on total moles of piperazine and toluene diamine.
(n)IA = isophthalic acid and is listed as mole percent based on total moles of dicarboxylic acid.
(o)DPA = diphenyladipate and is listed as mole percent based on the total moles of diaryl ester.
(p)MXDA = meta xylene diamine and is listed as mole percent based on the total moles of diamine.
(q)IA = isophthalic acid and is listed as mole percent based on total moles of acid.
(r)AA = adipic acid.
(s)MPD = meta phenylene diamine.
*Indicates no chain stopper used; all others used 2% ODA chain stopper.

Table 8 is a comparison of the Flexural modulus and heat distortion temperatures of various amorphous polyamides, a semicrystalline polyamide, and the amorphous polyamides of the present invention. The examples illustrate the high flexural modulus and heat distortion temperature (° F.) of the amorphous polyamide of the present invention.

TABLE 8

| Example | Nylon | Flexural Modulus (Kpsi) | HDT(°F.) |
|---|---|---|---|
| 39. | Selar PA (Nylon 6,I,T) | 417 | 213 |
| 40. | Trigamid T (Dynamit Noble) | 386 | 256 |
| 41. | MXDA + Adipic Acid MXD 6 — Semi-crystalline | 546 | 163 |
| 42. | Grilamid TR55 | 273 | 255 |
| 43. | 70/30/75/25(u) TDA/HMDA/DPI/DPT | 592.0 | 368 |

(u)Example 43 is an amorphous polyamide obtained from the reaction products of a diamine and a diaryl ester of a dicarboxylic acid. The diamine is 70 mole percent toluene diamine and 30 mole percent hexamethylenediamine based on the total moles of diamine. The diaryl ester is 75 mole percent diphenyl isophthalate and 25 mole percent diphenyl terephthalate based on the total moles of diaryl ester.

Table 9 illustrates the high flexural modulus and heat distortion temperatures obtained by reinforcing the polyamide with glass fibers. It is important in automotive applications involving glass mat reinforced polyamide composites that the composite and the polyamide have heat distortion temperatures above the temperature of the paint bake ovens (for example 350° F.).

TABLE 9

| Property | Polyamide(v) + 10% by Weight Glass Fibers & Pigment | Polyamide(v) + 20% By Weight Glass Fibers |
|---|---|---|
| Flexural Mod. (kpsi) | 853.8 | 1144 |
| HDT (F) (at 264 psi) | 381 | 398 |

(v) = Polyamide derived from reaction products of diamine and diaryl ester of polycarboxylic acid. The diamine is 70 mole percent toluene diamine and 30 mole percent hexamethylene diamine based on the total moles of diamine. The diaryl ester is 75 mole percent diphenyl isophthalate and 25 mole percent diphenyl terephthalate based on the total moles of diaryl ester.

Table 10 illustrates the high surface quality obtained in multilayer polyamide/glass mat laminates made from the polyamide of the present invention. Note that the polyamide laminates compare favorably with standard sheet molding compound composites and sheet metal.

TABLE 10

| | Polyamide(v)/Glass Mat/Polyamide(v)/Glass Mat/Polyamide(v) | | |
|---|---|---|---|
| | Laminate | Sheet Molding Compound Composite | Sheet Metal |
| Unpainted Substrate | | | |
| Roughness (microin.) | 3.8 | 3.7 | — |
| Maximum Peak-To-Valley Height (microin.) | 53 | 50 | — |
| Painted Part (250 F) | | | |
| Distinctness of Image | 86 | 81 | 86 |
| Roughness (microin.) | 1.8 | 2.2 | 2.2 |
| Maximum Peak-To-Valley Height (microin.) | 18 | 20 | 16 |
| Painted Part (350 F) | | | |
| Distinctness of Image | 75 | 69 | 79 |
| Roughness (microin.) | 3.7 | 5.5 | 2.8 |
| Maximum Peak-To-Valley Height (microin.) | 30 | 72 | 27 |

What is claimed:

1. A polyamide which is the reaction product of:
   (a) at least one diamine; and
   (b) at least one dicarboxylic acid, said diamine and said dicarboxylic acid being in a mole ratio of from 48:52 to 52:48, said diamine comprising:
   (i) toluenediamine at a level of from 10 to 50 mole percent based on the total moles of diamine and dicarboxylic acid; and
   (ii) an aliphatic diamine at a level of from 0 to 40 mole percent based on the total moles of diamine and dicarboxylic acid, said dicarboxylic acid comprising:
   (i) isophthalic acid at a level of from 5 to 50 mole percent based on the total moles of diamine and dicarboxylic acid,
   (ii) terephthalic acid present at a level of from 0 to 27.5 mole percent based on the total moles of diamine and dicarboxylic acid,
   (iii) an aliphatic dicarboxylic acid at a level of from 0 to 45 mole percent based on the total moles of diamine and dicarboxylic acid, said aliphatic diamine and aliphatic dicarboxylic acid being at a combined level of from 5 to 45 mole percent based on the total moles of diamine and dicarboxylic acid.

2. The polyamide of claim 1 wherein said toluenediamine is at a level of 20 to 40 mole percent based on the total moles of diamine and dicarboxylic acid, said aliphatic dicarboxylic acid being at a level of from 10 to 30 mole percent based on the total moles of diamine and dicarboxylic acid, said isophthalic acid being at a level of 25 to 45 mole percent based on the total moles of diamine and dicarboxylic acid, said terephthalic acid is at a level of 5 to 20 mole percent based on the total moles of diamine and dicarboxylic acid, said aliphatic dicarboxylic acid being present at a level of from 0 to 20 mole percent based on the total moles of diamine and dicarboxylic acid, and said aliphatic diamine and aliphatic dicarboxylic acid are at a combined level of from 10 to 35 mole percent based on the total moles of diamine and dicarboxylic acid.

3. The polyamide of claim 2 wherein said toluenediamine is at a level of about 35 mole percent based on the total moles of diamine and dicarboxylic acid, said aliphatic diamine is at a level of about 15 mole percent based on the total moles of aliphatic diamine and dicarboxylic, said isophthalic acid being at a level of about 37.5 mole percent based on the total moles of diamine and dicarboxylic acid, and said terephthalic acid being at a level of about 12.5 mole percent based on the total moles of diamine and dicarboxylic acid.

4. The polyamide of claim 1 wherein said diamine and said dicarboxylic acid are in a mole ratio of about 50:50.

5. The polyamide of claim 1 wherein said toluenediamine is a mixture of 2,6 toluenediamine and 2,4 toluenediamine, said 2,6 toluenediamine being at a level of 10 to 30 mole percent based on the total moles of toluenediamine, and said 2,4 toluenediamine being at a level of from 70 to 90 mole percent based on the total moles of toluenediamine.

6. The polyamide of claim 1 wherein said aliphatic diamine contains from 2 to 12 carbon atoms, and said aliphatic dicarboxylic acid contains from 2 to 14 carbon atoms.

7. A polyamide consisting essentially of units selected from the group consisting of:

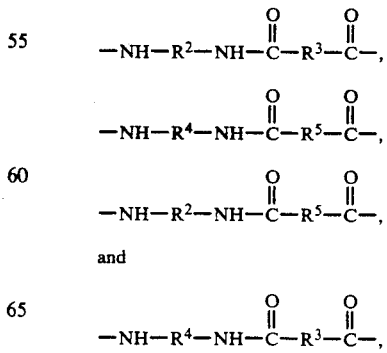

wherein $R^2$ is selected from the group consisting of:

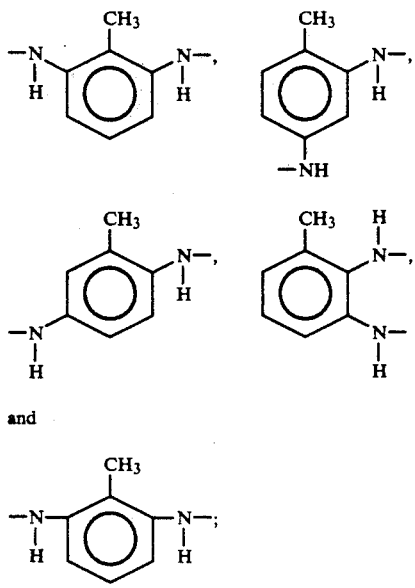

and

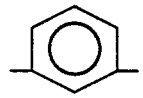

wherein $R^3$ is selected from the group consisting of a aliphatic hydrocarbon divalent radicals having from 1 to 12 carbon atoms therein; wherein $R^4$ is selected from the group consisting of straight and branched aliphatic divalent radicals having from 2 to 12 carbon atoms therein; and wherein $R^5$ is selected from the group consisting of:

and:

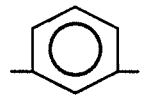

wherein the ratio of moles of:

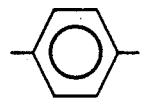

to moles of:

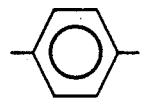

in the total moles of $R^5$ is between 5:27.5 and 100:0, wherein $R^2$ is present in said polyamide at a level of from 10 to 50 mole percent based on the total moles of $R^2$, $R^3$, $R^4$ and $R^5$ in the polyamide, wherein $R^3$ is present in the polyamide at a level of from 0 to 45 mole percent based on the total moles of $R^2$, $R^3$, $R^4$ and $R^5$ in the polyamide, wherein $R^4$ is present in polyamide at a level of from 0 to 40 percent based on the total moles of $R^2$, $R^3$, $R^4$ and $R^5$ in the polyamide, and wherein the combined total moles of $R^3$ and $R^4$ are present at a level of from 5 to 45 mole percent based on the total moles of $R^2$, $R^3$, $R^4$ and $R^5$ in the polyamide.

8. The polyamide of claim 7 wherein $R^2$ is present at a level of 20 to 40 mole percent based on the total moles of $R^2$, $R^3$, $R^4$ and $R^5$ present in the polyamide, wherein $R^3$ is present at a level of from 0 to 20 mole percent based on the total moles of $R^2$, $R^3$, $R^4$ and $R^5$ present in the polyamide, wherein $R^4$ is present at a level of from 10 to 30 mole percent based on the total moles of $R^2$, $R^3$, $R^4$ and $R^5$ present in the polyamide, and wherein $R^5$ is present at a level of from 30 to 50 mole percent based on the total moles of $R^2$, $R^3$, $R^4$ and $R^5$ present in the polyamide.

9. A polyamide composition comprising from 5 to 50 percent by weight glass fibers and from 95 to 50 percent by weight of a polyamide, said polyamide being derived from:
(A) a diamine; and
(B) a dicarboxylic acid, said diamine and said dicarboxylic acid being in a mole ratio of from 48:52 and 52:48, said diamine comprising:
  (i) toluenediamine at a level of from 10 to 50 mole percent based on the total moles of diamine and dicarboxylic acid; and
  (ii) an aliphatic diamine at a level of from 0 to 40 mole percent based on the total moles of diamine and dicarboxylic acid, said dicarboxylic acid comprising:
  (i) isophthalic acid at a level of from 5 to 50 mole percent based on the total moles of diamine and dicarboxylic acid,
  (ii) terephthalic acid present at a level of from 0 to 27.5 mole percent based on the total moles of diamine and dicarboxylic acid,
  (iii) an aliphatic dicarboxylic acid at a level of from 0 to 45 mole percent based on the total moles of diamine and dicarboxylic acid, said aliphatic diamine and aliphatic dicarboxylic acid being at a combined level of from 5 to 45 mole percent based on the total moles of diamine and dicarboxylic acid.

10. A process for the preparation of a polymer derived from toluenediamine, said process comprising the steps of:
(a) prereacting the toluenediamine with a diaryl ester selected from the group consisting of diphenyl isophthalate and mixtures of diphenyl isophthalate and diphenylterephthalate to end cap the toluenediamine with the diarylester, and
(b) react the encapped toluenediamine with an aliphatic diamine.

11. A polyamide which is the reaction product of:
(a) toluenediamine;
(b) isophthalic acid; and
(c) at least one aliphatic dicarboxylic acid.

12. The polyamide of claim 11 wherein said aliphatic dicarboxylic acid is adipic acid.

13. A polyamide which is the reaction product of:
(a) toluenediamine;
(b) at least one aliphatic diamine; and
(c) isophthalic acid.

14. The polyamide of claim 13 wherein said aliphatic diamine is hexamethylene diamine.

15. A polyamide which is the reaction product of:
(a) toluenediamine;
(b) at least one aliphatic diamine;
(c) isophthalic acid; and
(d) terephthalic acid.

16. The polyamide of claim 15 wherein said aliphatic diamine is diamino-2-methylpentane.

17. A polyamide which is the reaction product of:
(a) toluenediamine;
(b) at least one aliphatic diamine;
(c) isophathalic acid; and
(d) at least one aliphatic dicarboxylic acid.

18. A polyamide which is the reaction product of:
(a) toluenediamine;
(b) at least one aliphatic diamine;
(c) isophthalic acid;
(d) terephthalic acid; and
(e) at least one aliphatic dicarboxylic acid.

* * * * *